(12) United States Patent
Matchen

(10) Patent No.: US 6,731,285 B2
(45) Date of Patent: May 4, 2004

(54) SYSTEM AND METHOD FOR PROVIDING HIGH PERFORMANCE IMAGE MAGNIFICATION IN A WEB BROWSER

(75) Inventor: Paul M. Matchen, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 09/757,613

(22) Filed: Jan. 11, 2001

(65) Prior Publication Data

US 2002/0089502 A1 Jul. 11, 2002

(51) Int. Cl.[7] .............................................. G06T 15/00
(52) U.S. Cl. ....................................................... 345/428
(58) Field of Search ................................ 345/428, 629, 345/634, 704, 762; 382/128

(56) References Cited

U.S. PATENT DOCUMENTS 6,043,802 A * 3/2000 Gormish ...................... 345/596
6,101,265 A * 8/2000 Bacus et al. ................. 382/133

* cited by examiner

*Primary Examiner*—Phu K. Nguyen
(74) *Attorney, Agent, or Firm*—Whitham, Curtis, & Christofferson, P.C.; Stephen C. Kaufman

(57) ABSTRACT

High resolution details of an image can be accessed through manipulation of a cursor (or data points) on a reduced resolution display. The coordinates of the cursor on the reduced resolution image reference coordinates of a stored high resolution image. As the cursor moves about the reduced resolution image a portion of the high resolution image can be constantly displayed. The portion displayed depends upon cursor coordinates. The portion displayed may also be zoomed in or out.

10 Claims, 8 Drawing Sheets

SYSTEM AND METHOD FOR PROVIDING HIGH PERFORMANCE IMAGE MAGNIFICATION IN A WEB BROWSER

BACKGROUND OF THE INVENTION

1. Field of the Invention

The present invention generally relates to computer storage and manipulation of images and, more particularly, to a system and method for overlaying a magnified high resolution portion of an image over a reduced resolution version of the image using a Web browser and preserving contextual information about the image.

2. Background Description

In many applications, high resolution images may be obtained via medical imaging technologies or high resolution optical scanners. These high resolution images may be used to search for features such as tumors, fractures, defects, hidden details or other artifacts. It is often useful to see the whole image, in order to provide context, while viewing a closer, more detailed section of the image. Traditional images viewed in a web browser are stored at a resolution that matches the resolution of the display. Any enlargement of the image reveals no further detail, but rather detracts from the image quality by enlarging individual picture elements, or pixels, to make up for the larger image size.

SUMMARY OF THE INVENTION

It is therefore an object of the present invention to provide a system and method of storing and enlarging images to show high resolution details in the images.

Traditional magnification techniques involve positioning a selection box or pointer above the reduced resolution image and clicking to zoom to a higher resolution view of the image. There is no smooth traversal of the image as with moving a traditional magnifying glass over a photograph. This invention more closely models a traditional magnifying glass and allows smooth movement over the image. It also preserves contextual information about the position within the image by overlaying a magnified view of the image over reduced resolution image.

This system and method allows for a viewing of high resolution images in such a way that enlargement of a given section of the image reveals more details because the actual image data is stored at a higher resolution than the display device. The method involves the creation of an ultra-high resolution image via the use of an optical scanner or medical imaging device. This image is stored to a digital media storage device such as the hard disk drive of a computer. Via traditional published methods of resizing a digital image, a reduced resolution image is created from the original, ultra-high resolution image, so that the reduced resolution image matched the resolution of the display device.

The reduced resolution image may now be displayed on the display device using a web browser and requiring no scaling for the image to fit on the display. The ultra-high resolution image may be loaded into the memory of the web browser, but not displayed at this time. An input device, such as a mouse or trackball or touchscreen display, can now be used to traverse over the reduced resolution image. As the reduced resolution image is traversed, the position of the traversal may be determined, as in two dimensional mouse coordinates, and the position relative to the image can be determined as a factor of the actual image dimensions. This two dimensional factor may now be used to determine the position of the traversal in the ultra-high resolution image. A portion of the ultra-high resolution image may now be displayed on top of the reduced resolution image, offset to the mouse or trackball's current position, at the actual ultra-high resolution, and cropped to a selected display size. Input via another device, such as a keyboard or separate controls, may provide input to the web browser to allow the size of the cropped, ultra-high resolution image to be enlarged or reduced.

In practice, two images are stored, a reduced resolution image which is displayed on the monitor and a larger high resolution image of which portions are displayed. As the cursor is moved about the lower resolution image a box is constantly displaying a portion of the high resolution image. The portion displayed depends upon the location of the cursor. Additionally, the amount of the high resolution image displayed overlaying the low resolution image is set by the user. Basically, the user can move about the low resolution image and zoom in or zoom out on a detail as he or she chooses.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
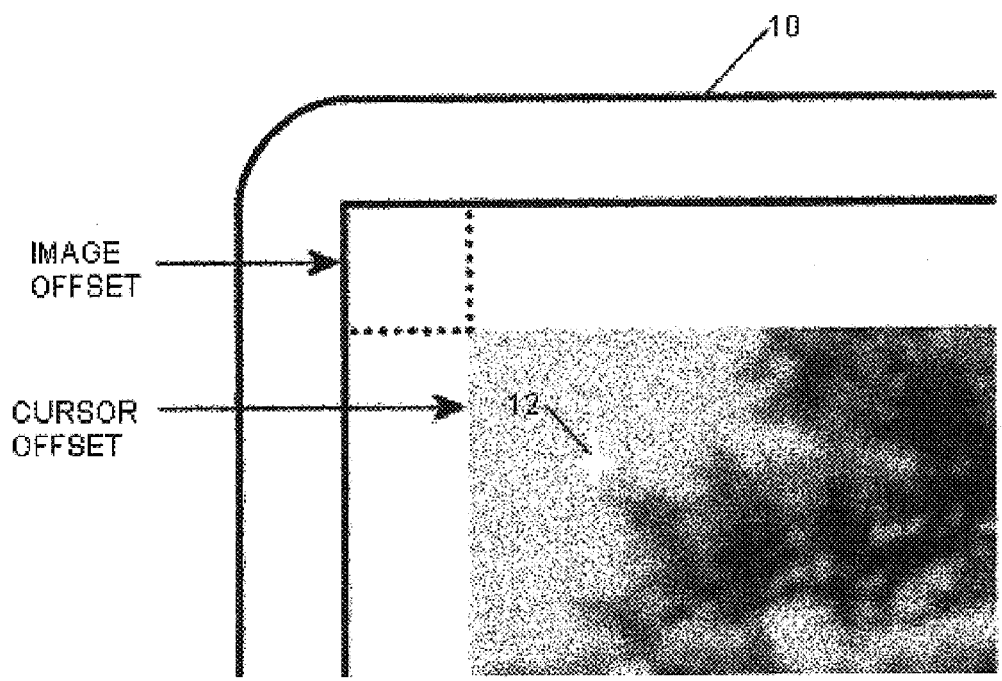
FIG. 1 is a partial schematic of a corner of monitor display.

Referring now to the drawings, and more particularly to FIGS. 1 to 5, which illustrate the steps of overlay with a cropped high resolution image. First, the original, ultra high resolution image is obtained from a medical image device, high resolution optical scanner, scanner connected to a telescopic device, scanner connected to a microscopic device, or by some other means.

The original ultra high resolution image is copied and reduced to a resolution that matches the display resolution, this becomes the reduced resolution screen image. Both the reduced resolution image and the ultra high resolution image are loaded into the browser memory and the reduced resolution image is then shown on the display. A mouse or track ball or touch screen input device is used to traverse the reduced resolution image, providing two dimensional coordinates as it moves over the image.

The relative positioning of the mouse or track ball cursor can be calculated as the difference of the position pointer and the position of the reduced resolution image:

Cursor Position in Image=Cursor Position on Display−Image Position on Display

FIG. 1 shows a partial schematic of one corner of screen display 10, in which the cursor 12 can be moved about to any desired position in the image while the cursor position is calculated as above. Given the cursor offset within the reduced resolution image, the relative cursor position within the image can be calculated as the cursor offset within the image divided by the dimensions of the reduced resolution image:

Relative Position in Image=Cursor Offset in Image(x,y)/Dimension of Image(width,height)

Figure 2:
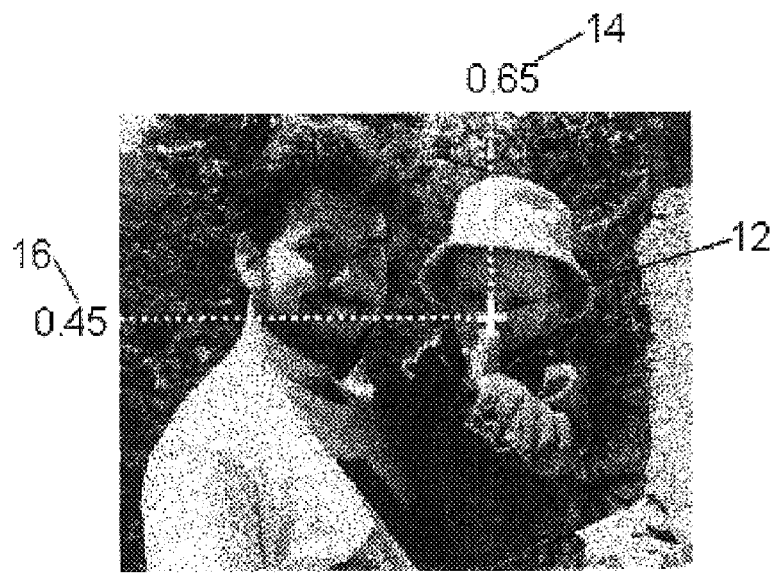
FIG. 2 is a schematic of a reduced resolution image for display on a monitor.
Figure 3:
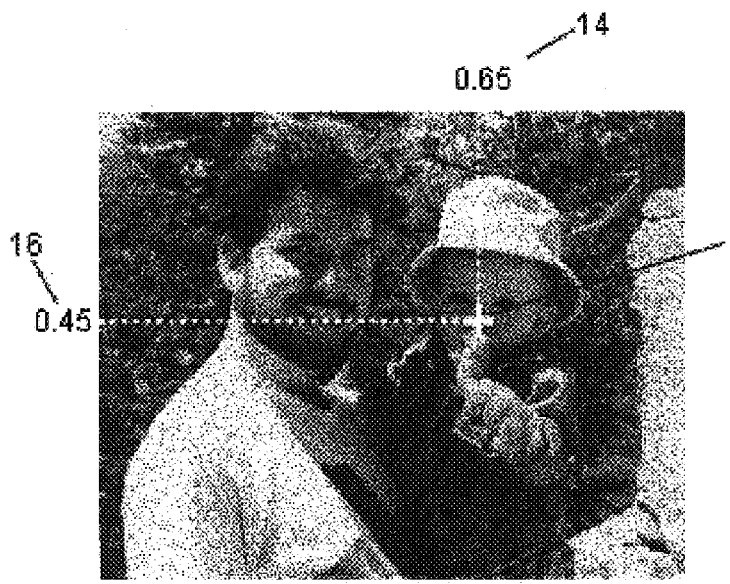
FIG. 3 is a schematic of a high resolution image.

As can be seen in FIG. 2, the cursor 12 designates x coordinate 14 and y coordinate 16. Now, the location of the area under the cursor 12 in the reduced resolution image can be found in the ultra high resolution image by multiplying the relative position factor by the dimension of the ultra high resolution image:

Position in high resolution image=Relative Position in Reduced Resolution Image*Dimension of High Resolution Image Once this calculation is made coordinates are pinpointed to the high resolution images as shown in FIG. 3.

Figure 4:
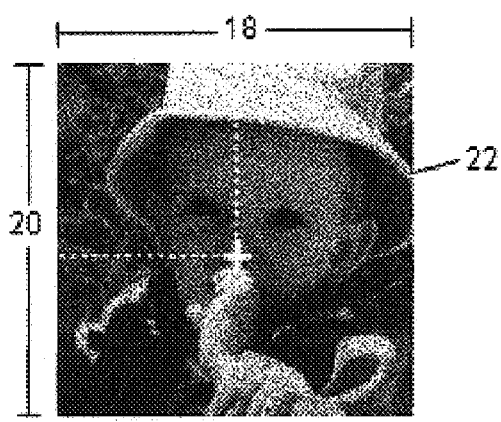
FIG. 4 is a schematic of a cropped area as found in a high resolution.
Figure 5:
FIG. 5 is an overlay of a high resolution cropped image over a reduced resolution screen image.

The ultra high resolution image can now be cropped to the size of the overlay box by specifying a rectangular region encompassing the position in the high resolution image, of the width and height of the overlay box. As shown in FIG. 4, a width 18 and height 20 define the cropped area 22. The cropped image 22 can now be translated to overlay 24 the reduced resolution image 26 such that the cropped ultra high resolution image is centered about the cursor position as shown in FIG. 5. If the cursor position is now moved, the cropping and translating steps are repeated to again center the overlay box about the cursor, thus revealing a different area of the ultra high resolution image.

The high performance of the present invention comes form the fact that no resizing of the ultra high resolution image takes place during the translation and cropping phase. Additional inputs can be added to cause the ultra high resolution image to be scaled in the browser memory on browsers that have high performance scaling routines. The ultra high resolution image resides in the memory of the web browser and does not need to be fetched from the disk drive except on the initial load. The image is repositioned and cropped using the facilities provided by the browser and defined by the World Wide Web Consortium (W3C) in the Cascading Style Sheets Specification at http://www.w3.org/Style/CSS.

Figure 6:
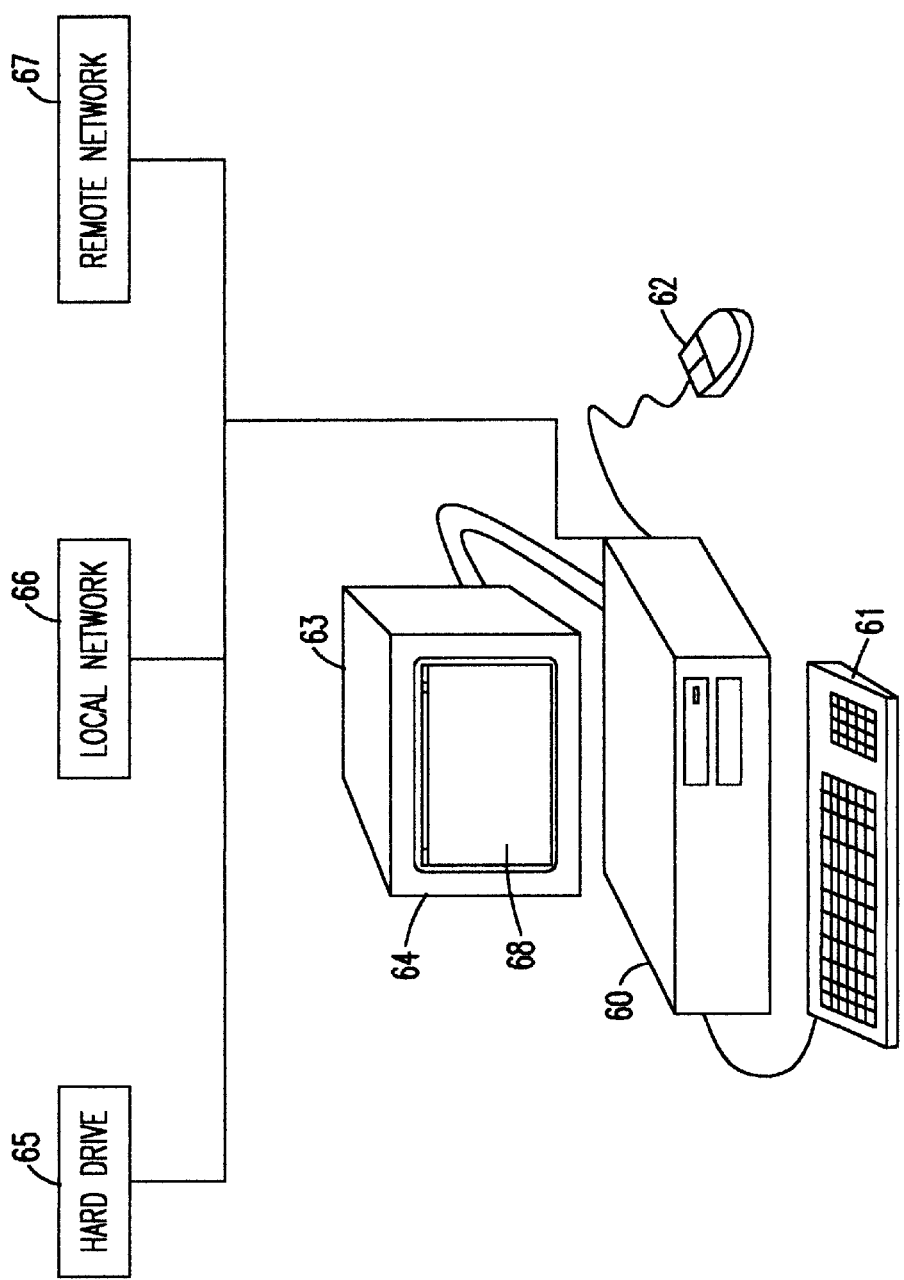
FIG. 6 is a block diagram of a computer system on which the invention may be implemented.

FIG. 6 shows a computer system on which the method according to the invention may be implemented. The system comprises a client computer 60, such as a personal computer (PC), having a keyboard 61 and a pointing device, such as a mouse 62. A display unit 63 fitted with a touch screen display 64 also provides user input to the computer 60. The computer 60 is connected to a local hard drive 65 and also to a local area network (LAN) 66 and possibly to a remote network 67, depending on the specific application. A Web browser 68 is installed on the computer 60 and displayed on the screen of the display unit.

Figure 7:
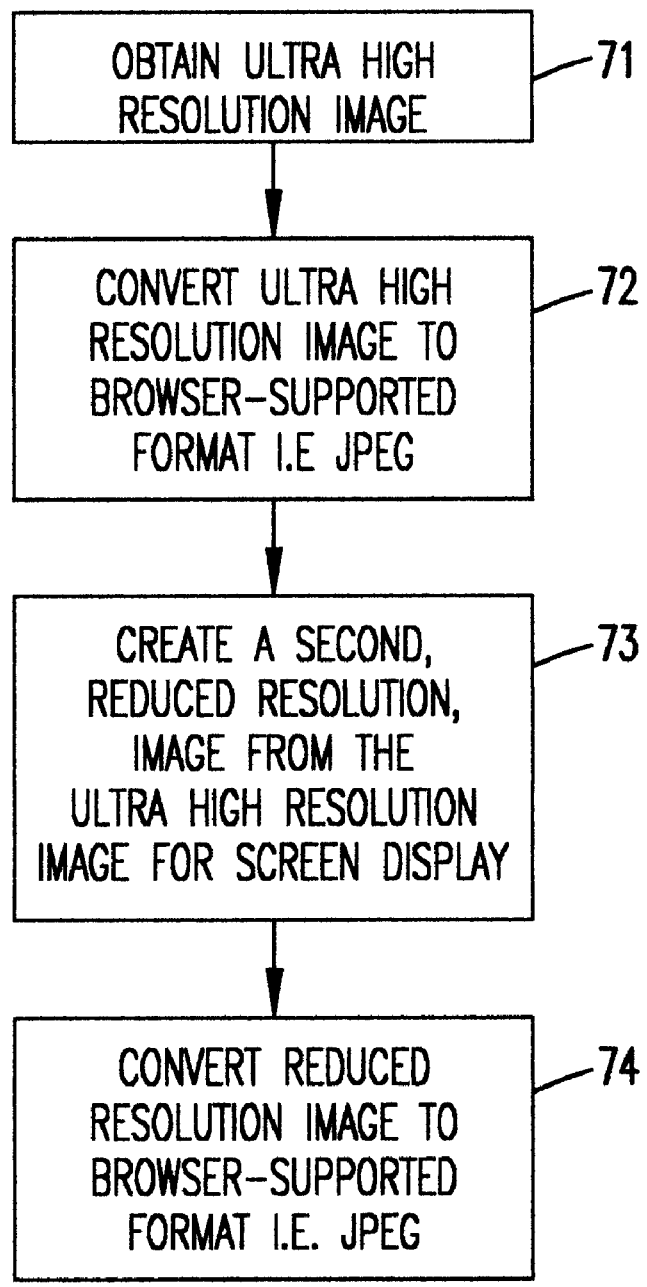
FIG. 7 is a flow diagram showing the logic for processing the images to be used by the system.

FIG. 7 shows the process of acquiring and processing images used by the system. In function block 71, an ultra high resolution image is acquired. This may be done, for example, by using medical imaging technologies or a high resolution optical scanner. The ultra high resolution image is next converted to a browser-supported format in function block 72. One such browser-supported format is JPEG (Joint Photographic Experts Group). Then, in function block 73, a second, reduced resolution image is created from the ultra high resolution image for screen display. Finally, in function block 74, the reduced resolution image is converted to browser-supported format, i.e., JPEG.

Figure 8A:
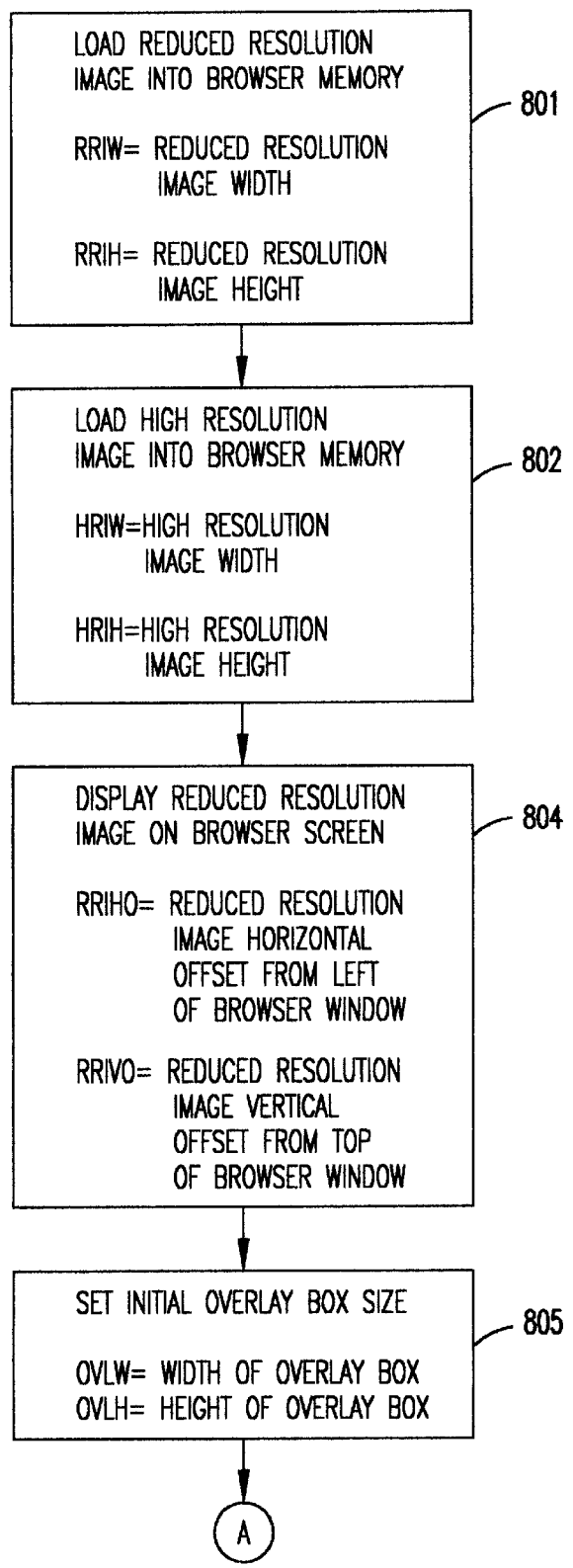
FIGS. 8A, 8B and 8C, taken together, are a flow diagram showing the logic of the computer implemented method according to the invention.
Figure 8B:
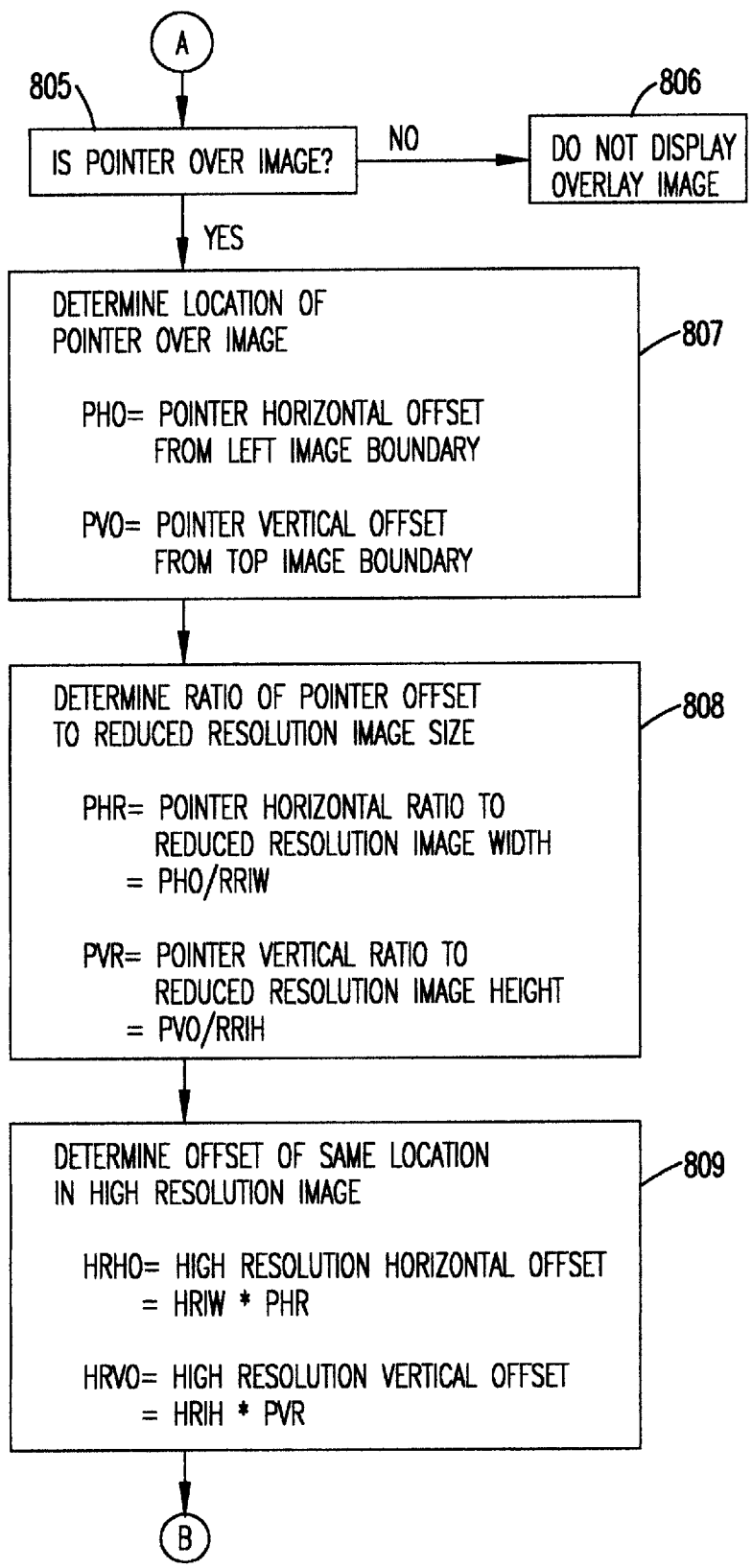
Figure 8C:
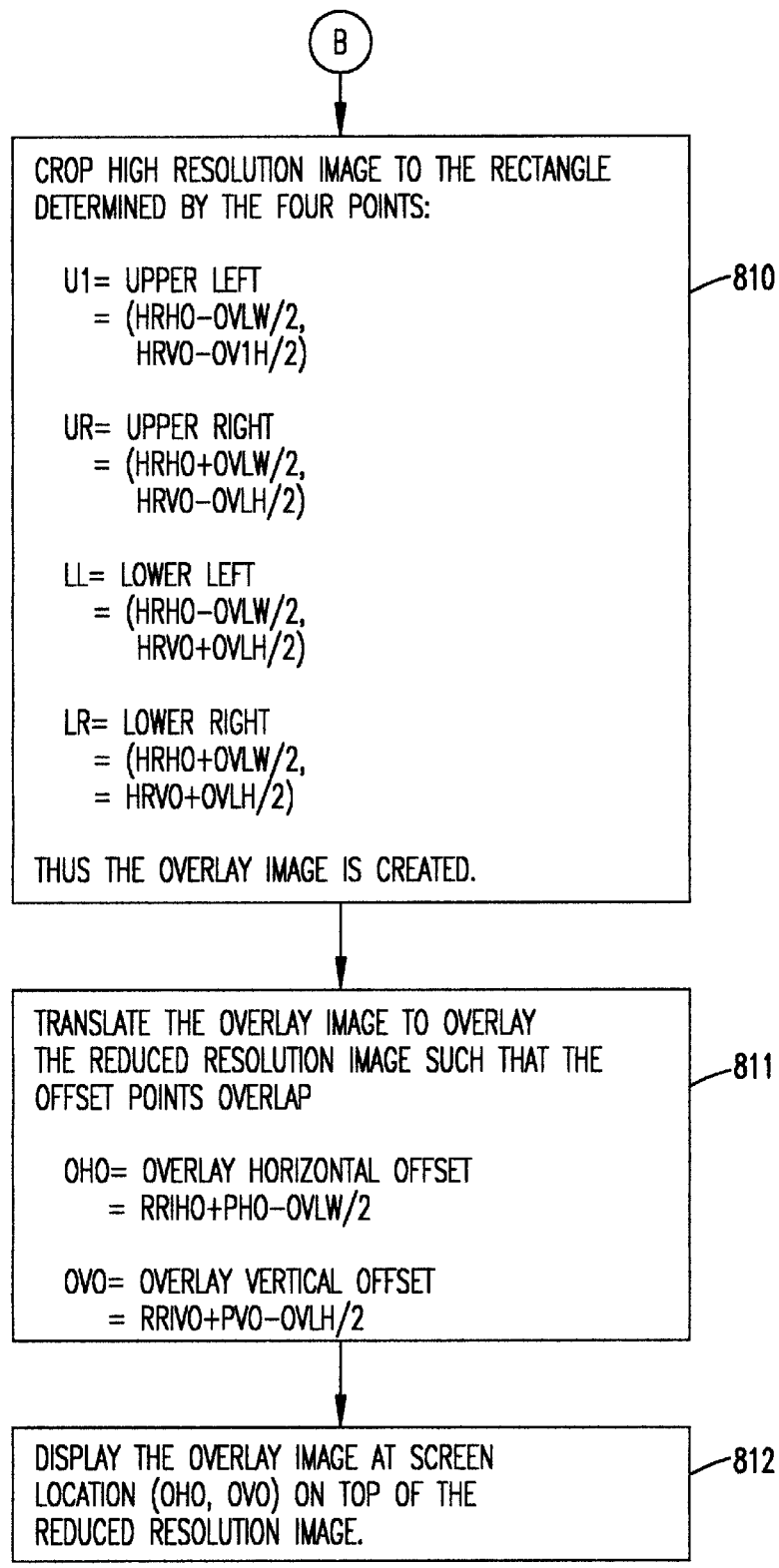
Figure 9:
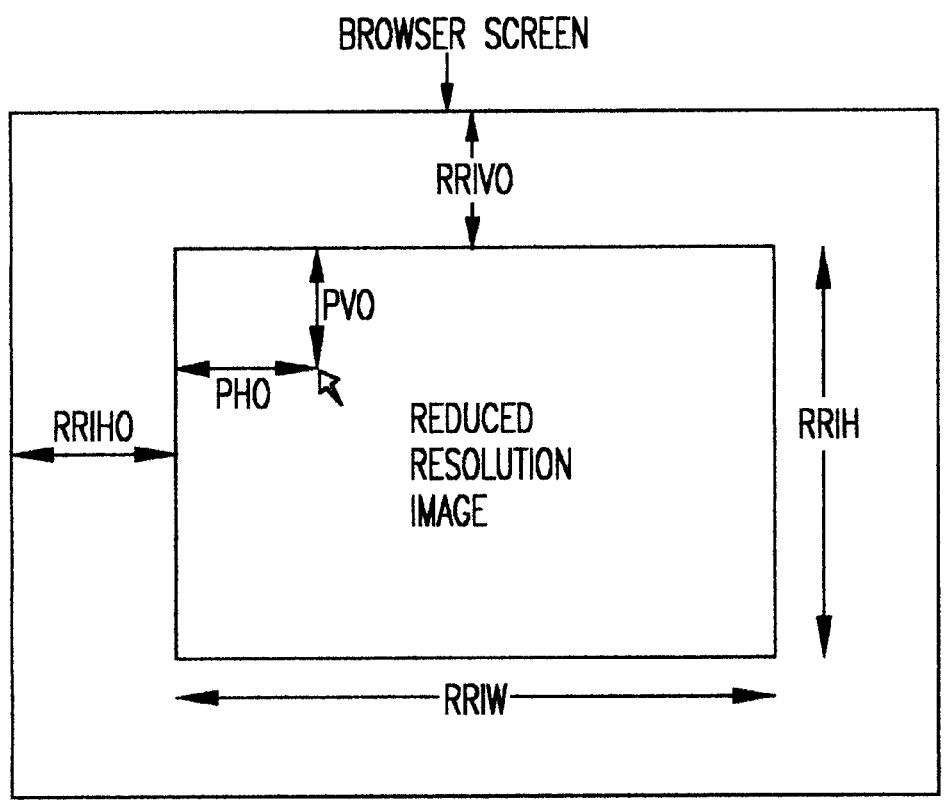
FIG. 9 is a diagram of the browser screen which illustrates several of the variables processed in the method according to the invention.

The method according to the invention is illustrated in the flow diagrams of FIGS. 8A, 8B and 8C. Beginning with FIG. 8A, the first step in function block 801 is to load the reduced resolution image into the browser memory. The dimensions are defined in the browser memory as rriW=reduced resolution image width rriH=reduced resolution image height Next, in function block 802, the high resolution image is loaded into the browser memory. The dimensions are defined in the browser memory as hriW=high resolution image width hriH=high resolution image height With the reduced resolution and the high resolution images loaded in the browser memory, the process can now display the reduced resolution image on the browser screen in function block 803. The display of the reduced resolution image is with an offset defined as rriho=reduced resolution image horizontal offset from left of browser window rrivo=reduced resolution image vertical offset from top of browser window These variables are illustrated in FIG. 9 which shows an example of the browser screen. The initial overlay box size is set in function block 804 as ovlW=Width of overlay box ovlH=Height of overlay box Next, in decision block 805 shown in FIG. 8B, a determination is made as to whether the pointer (e.g., cursor) is over the image. If it is not, then the overlay image is not displayed in function block 806. However, if the pointer is over the image, then in function block 807, the location of the pointer over the image is determined. This location is defined as pho=pointer horizontal offset from left image boundary pvo=pointer veritcal offset from top image boundary Next, in function block 808, the ration of the pointer offset to the reduced resolution image size is determined. This ratio is defined as $phr$=pointer horizontal ratio to reduced resolution image width= $pho/rriW$ $pvr$=pointer vertical ratio to reduced resolution image height=$pvo/rriH$ See again FIG. 9 which shows the relationship of these variables. The next step in function block 809 is to determine the offset of the same location in the high resolution image. This is defined as $hrho$=high resolution horizontal offset=$hriW \times phr$ $hrvo$=high resolution vertical offset=$hriH \times pvr$ In function block 810 in FIG. 8C, the high resolution image is cropped to the rectangle determined by the four points:

$ul$=upper left=$(hrho-ovlW/2, hrvo-ovlH/2)$ $ur$=upper right=$(hrho+ovlW/2, hrvo-ovlH/2)$ $ll$=lower left=$(hrho-ovlW/2, hrvo+ovlH/2)$ $lr$=lower right=$(hrho+ovlW/2, hrvo+ovlH/2)$ In this way, the overlay image is created. The overlay image is then translated in function block 811 to overlay the reduced resolution image such that the offset points overlap.

$oho$=overlay horizontal offset=$rriho+pho-ovlW/2$ $ovo$=overlay vertical offset=$rrivo+pvo-ovlH/2$ The overlay image is displayed as screen location (oho, ovo) on top of the reduced resolution image in function block 812.

While the invention has been described in terms of a single preferred embodiment, those skilled in the art will recognize that the invention can be practiced with modification within the spirit and scope of the appended claims.

We claim:

1. A computer system for providing high performance image magnification in a Web browser comprising:

means of acquiring and storing an ultra high resolution image;

means for converting the ultra high resolution image to a browser-supported format;

means for creating a second, reduced resolution image from the ultra high resolution image for screen display;

means for converting the reduced resolution image to a browser-supported format;

means for loading the converted ultra high resolution and reduced resolution images into a browser memory;

means for displaying the converted reduced resolution image on a browser screen;

an input device for pointing to a location on the browser screen;

means responsive to the input device for determining a portion of the converted ultra high resolution image to overlay on the browser screen; and means for displaying the portion of the converted ultra high resolution image on the browser screen at the location pointed to by the pointing device.

2. The computer system as recited in claim 1, wherein the ultra high resolution image is acquired by a medical imaging device.

3. The computer system as recited in claim 1, wherein the ultra high resolution image is acquired by a high resolution optical scanner.

4. The computer system as recited in claim 1, wherein the means responsive to the input device for determining a portion of the converted ultra high resolution image to overlay on the browser screen crops the converted ultra high resolution image to predetermined dimensions.

5. The computer system as recited in claim 4, wherein the means for displaying the portion of the converted ultra high resolution image on the browser screen at the location pointed to by the pointing device translates the cropped converted ultra high resolution image to offset points determined by a location of the pointing device.

6. A computer implemented method for providing high performance image magnification in a Web browser comprising the steps of:

acquiring and storing an ultra high resolution image;

converting the ultra high resolution image to a browser-supported format;

creating a second, reduced resolution image from the ultra high resolution image;

converting the reduced resolution image to a browser-supported format;

loading the converted ultra high resolution and reduced resolution images into a browser memory;

displaying the converted reduced resolution image on a browser screen;

receiving position information from an input device pointing to a location on the browser screen;

determining from the position information a portion of the converted ultra high resolution image to overlay on the browser screen; and displaying the portion of the converted ultra high resolution image on the browser screen at the location pointed to by the pointing device.

7. The computer implemented method as recited in claim 6, wherein the step of acquiring an ultra high resolution image is performed by a medical imaging device.

8. The computer implemented method as recited in claim 6, wherein the step of acquiring an ultra high resolution image is performed by a high resolution optical scanner.

9. The computer implemented method as recited in claim 6, wherein the step of determining from the position information a portion of the converted ultra high resolution image to overlay on the browser screen includes the step of cropping the converted ultra high resolution image to predetermined dimensions.

10. The computer implemented method as recited in claim 9, wherein the step of displaying the portion of the converted ultra high resolution image on the browser screen at the location pointed to by the pointing device includes the step of translating the cropped converted ultra high resolution image to offset points determined by the position information.

* * * * *